March 15, 1938.  L. E. LA BRIE  2,110,935
BRAKE
Filed Oct. 29, 1934  4 Sheets-Sheet 1
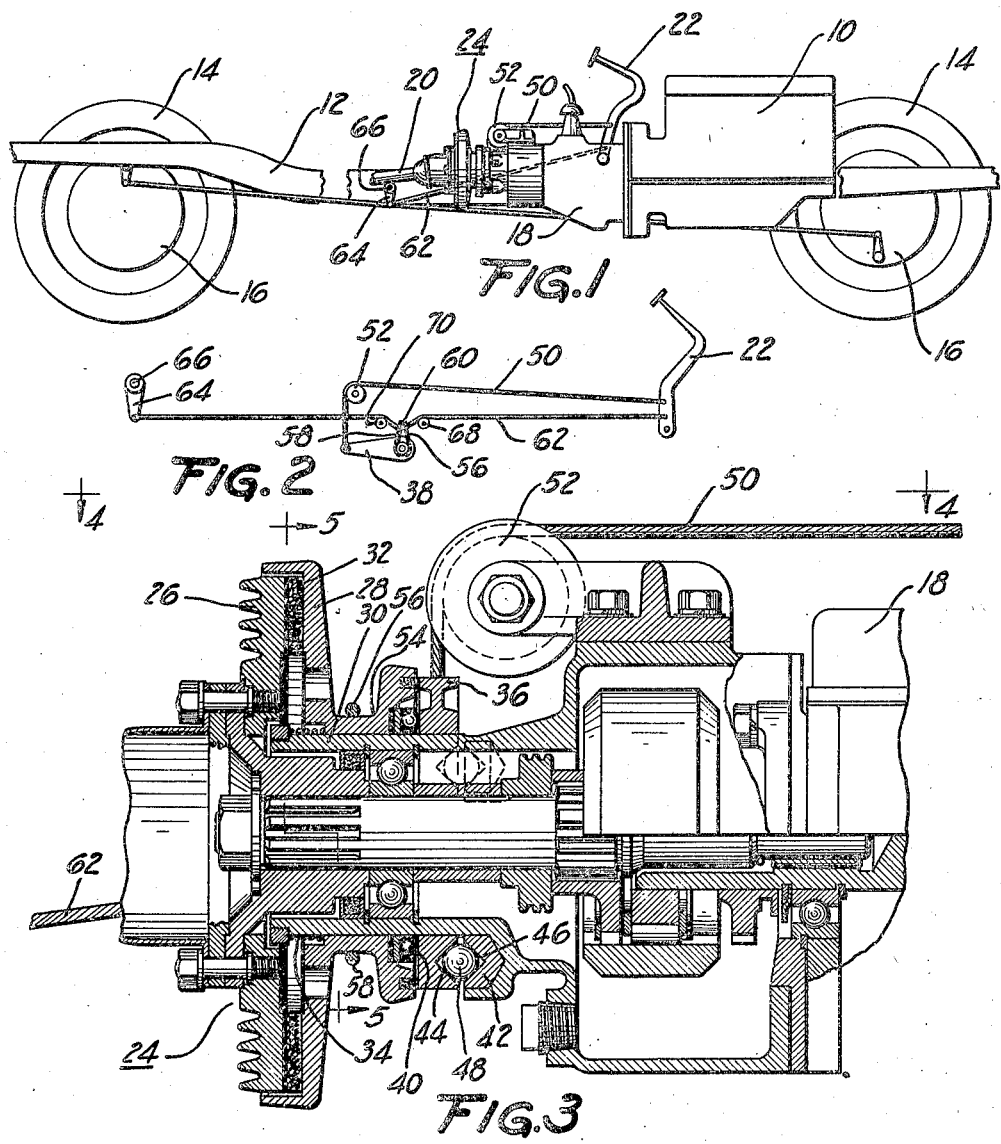
INVENTOR.
LUDGER E. LA BRIE
BY
Jerome R Cox
ATTORNEY March 15, 1938.  L. E. LA BRIE  2,110,935
BRAKE
Filed Oct. 29, 1934   4 Sheets-Sheet 2

INVENTOR.
LUDGER E. LA BRIE
BY Jerome R. Cox
ATTORNEY

March 15, 1938.   L. E. LA BRIE   2,110,935
BRAKE
Filed Oct. 29, 1934   4 Sheets-Sheet 3

INVENTOR.
LUDGER E. LA BRIE
BY Jerome R. Cox
ATTORNEY

INVENTOR.
LUDGER E. LA BRIE
BY Jerome R Cox
ATTORNEY

Patented Mar. 15, 1938

2,110,935

UNITED STATES PATENT OFFICE 2,110,935

BRAKE

Ludger E. La Brie, South Bend, Ind., assignor to Bendix Products Corporation, South Bend, Ind., a corporation of Indiana Application October 29, 1934, Serial No. 750,433

14 Claims. (Cl. 188—140)

This invention relates to brakes, and more particularly to means for applying the brakes of an automotive vehicle.

According to a preferred embodiment of the invention a servo motor comprising a plurality of frictional elements is employed to assist the operator in applying the brakes. One of the frictional elements is fixed to the propeller shaft and rotates therewith, while another of said elements herein called the stator element is loosely mounted on the propeller shaft and is adapted to be moved into contact with the rotating element, whereby rotative movement will be imparted to the stator element and employed to assist the operator in applying the brakes.

An object of this invention is therefore to provide a brake applying mechanism wherein the operator will be relieved of the greater portion of the physical labor in actuating the brakes.

A further object of the invention is to provide a brake applying means, wherein a certain proportion of the brake applying force is directed back to the brake pedal, so that the operator may feel a reaction to further movement of the pedal and therefore be apprised of the brake applying force exerted.

Another object of this invention is to provide a servo brake applying mechanism operable regardless of the direction of movement of the vehicle.

A still further object of this invention is to provide in combination with a servo brake applying mechanism, a positive mechanical connection between the brake applying pedal and the brakes, whereby the brakes may be positively applied should the servo mechanism fail for any reason.

Other objects and advantages of the present invention will be apparent from the following detailed description and the accompanying drawings submitted for illustrative purposes only and not intended to define the scope of the invention, reference being had for that purpose to the subjoined claims.

In the drawings, wherein similar reference characters refer to similar parts throughout the several views:

Figure 1 is a longitudinal view of a portion of an automotive vehicle equipped with a device of the present invention;

Figure 2 is a diagrammatic view illustrating the form of hook-up employed;

Figure 3 is an enlarged sectional view of a portion of the servo mechanism shown in Figure 1;

Figure 4:
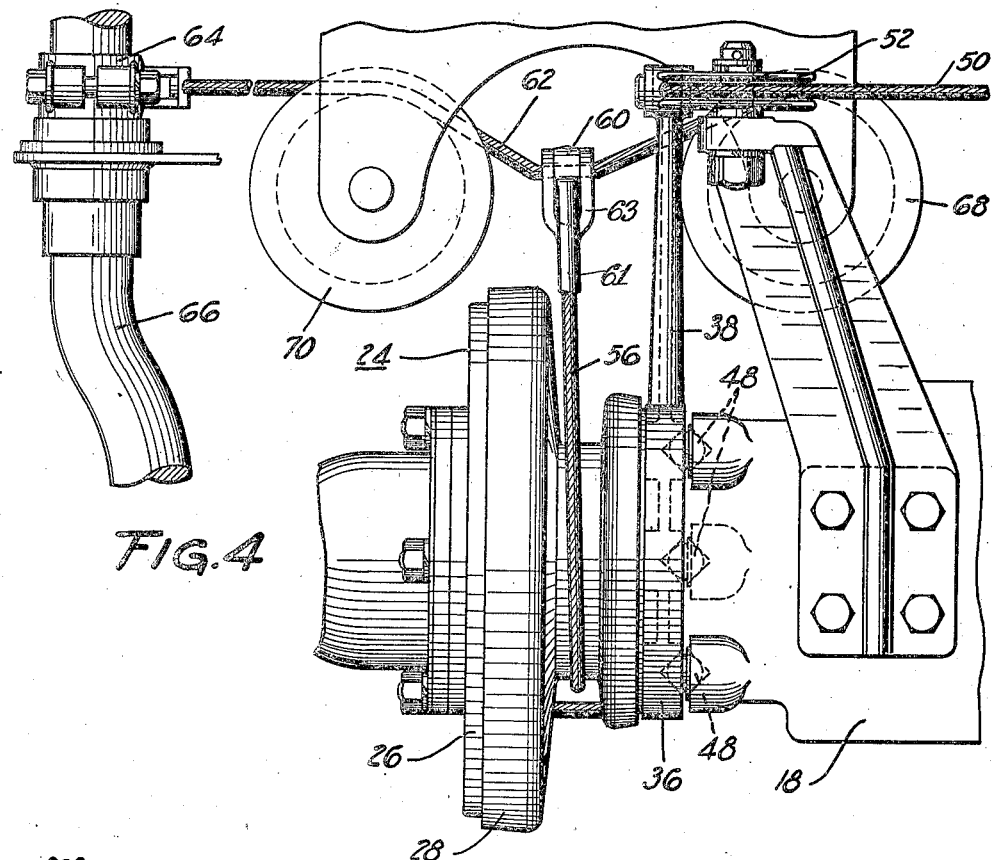
Figure 4 is a fragmentary view on the line 4—4 of Figure 3.
Figure 5:
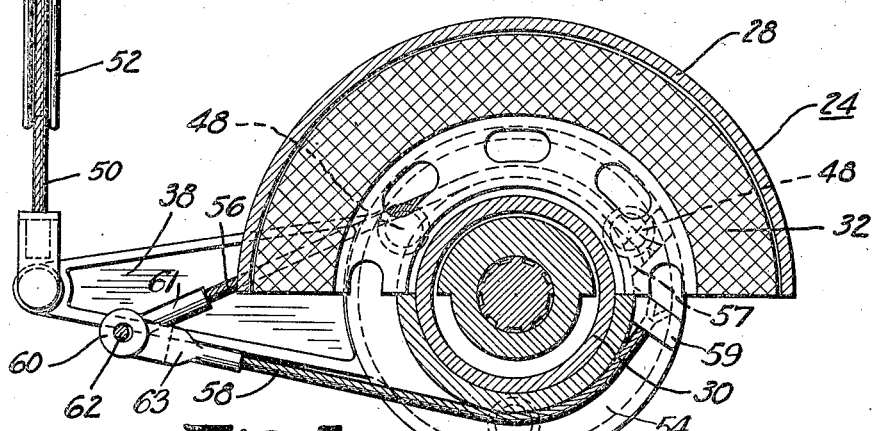
Figure 5 is a sectional view on the line 5—5 of Figure 3.

Referring more particularly to Figure 1 there is shown a portion of an automotive vehicle having an engine 10 supported by longitudinal frame members 12. The frame members 12 are supported by road wheels 14 having brakes 16. The engine 10 is equipped with a change-speed transmission 18 which transmits the power from the engine to the driving wheels through a drive shaft 20. The brakes 16 of the wheels 14 are applied by depressing a brake pedal 22.

Positioned immediately posterior to the transmission 18 is a servo mechanism 24 which assists the operator in applying the brakes. The servo mechanism comprises a rotor disc 26 fixed to the drive shaft 20 and an axially movable stator disc 28 slidably mounted upon a sleeve 30 surrounding the drive shaft assembly. The stator disc is provided with frictional facing material 32 adapted to engage the surface of the rotor disc 26. The rotor disc 26 and the stator disc 28 are yieldingly urged apart by a spring 34.

Means are provided for causing the stator disc to be driven when desired by the rotor disc so that brake applying force may be developed. A collar 36 having an arm 38, Figure 4, extending laterally therefrom is rotatably mounted upon the sleeve 30 and is separated from the stator disc 28 on one side by ball bearings 40. The other side of the collar 36 and the side of a member 42 cooperating therewith are formed in their opposed inside faces with a plurality of equally spaced matching conical indentations 44 and 46 respectively, which receive anti-friction ball members 48 whose function it is to force the two matching surfaces apart when the collar 36 is rotated whereby the stator disc 28 will be moved axially to engage the rotor disc 26. The laterally extending arm 38 fixed to the collar 36 receives one end of a cable 50 which passes over a roller 52 and connects the arm 38 to the brake pedal 22.

Means are provided for transferring the brake applying force from the stator disc to the brakes. The stator disc 28 is formed with a groove 54 which receives two cables 56 and 58 fixed to the disc at 57 and 59 respectively whereby one of the cables 56 or 58 will be wrapped upon the disc 28 as it is rotated in either direction. The ends of the cables 56 and 58 are brought together into a connection 60 comprising clevises 61 and 63 fixed to one end of each of the cables 56 and 58 respectively through which another cable 62 passes. The cable 62 connects the brake pedal 22 to a crank 64 fixed to a cross shaft 66 whereby the brakes 16 are actuated. The cable 62 passes over two rollers 68 and 70 positioned on either side of the connection 60.

The operation of the device thus far described is as follows. When the operator wishes to apply the brakes he depresses the brake pedal 22. Tension is then exerted through the cable 62 to the crank 64 to rotate the cross shaft 66 to positively apply the brakes 16. As the pedal 22 is depressed tension is also exerted on the cable 50 to rotate the arm 38 fixed to the collar 36. As the collar 36 is rotated the balls 48 positioned in the matching conical indentations 44 and 46 force the collar 36 to the left as viewed in Figure 3. The movement of the collar 36 is imparted to the stator member 28 by the ball bearings 40. The stator member 28 is thus urged into contact with the rotor member 26 and will tend to rotate therewith. The rotation of the stator member 28 is resisted by one of the cables 56 or 58 connected with the brake actuating cable 62. The stator disc 28 will tend to move with the rotor disc 26 regardless of the direction of rotation of the rotor disc, so that force will be exerted upon the cable 62 to assist the operator in applying the brakes regardless of whether the vehicle is moving forward or backward.

In this embodiment of the invention, a part of the brake applying force exerted by the servo mechanism 24 is directed back through the cable 62 to the brake pedal 22 so that the operator may be apprised, by the resistance to further movement of the pedal 22 or the feel of the pedal, of the amount of brake applying force exerted.

It will be noted that in this embodiment the brakes may be positively actuated should the servo mechanism 24 for any reason become inoperative. A novel brake applying mechanism is thus provided whereby the brakes may be applied with a minimum of effort on the part of the operator and a factor of safety is also provided in that the operator can always apply the brakes manually should the power means fail.

Figure 6:
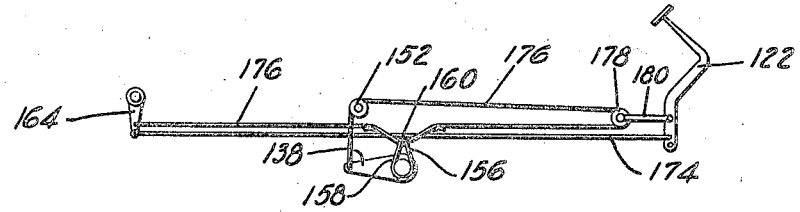
Figure 6 is a diagrammatic view, similar to Figure 2 showing a modified form of hook-up.
Figure 7:
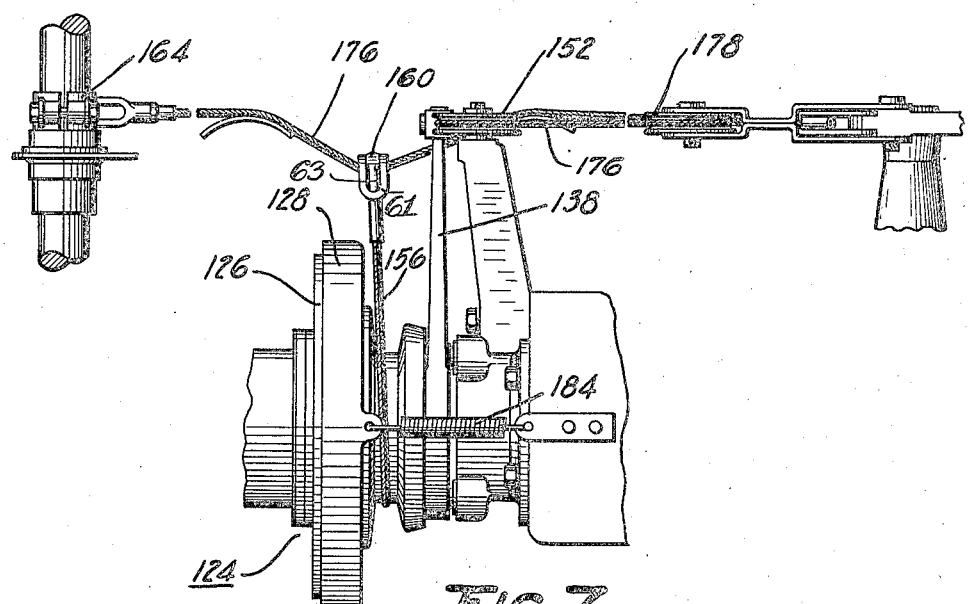
Figure 7 is a plan view of the servo mechanism represented diagrammatically in Figure 6.
Figure 8:
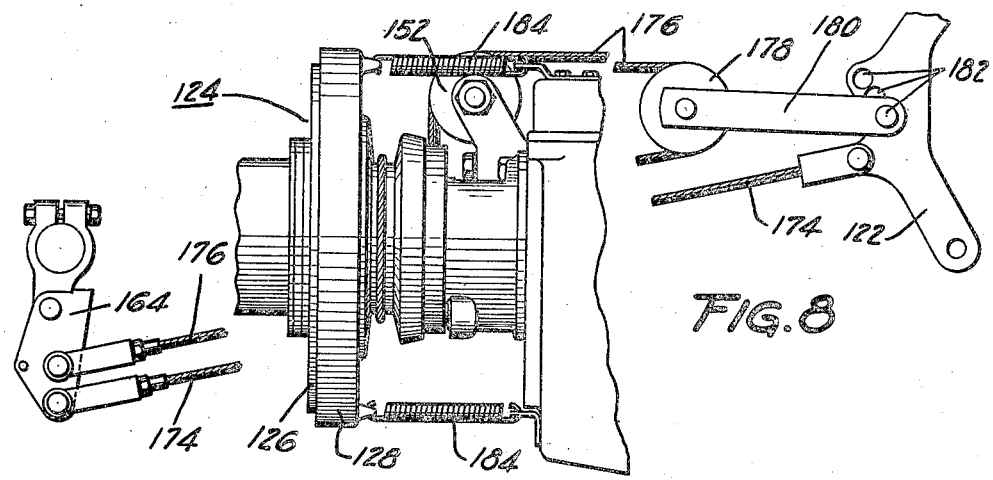
Figure 8 is an elevation of the structure disclosed in Figure 7.

The embodiment of the invention disclosed in Figures 6, 7, and 8 is similar in many respects to the preferred embodiment described above. The same type of servo mechanism is employed to assist the operator but the connection between the brake pedal 122, the servo mechanism 124 and the crank 164 is different.

A cable 174 forms a direct connection between the brake pedal 122 and the cross shaft 164 whereby the brakes may be positively actuated by depressing the brake pedal 122. A cable 176 connected with the arm 138 passes over the roller 152 and around a pulley 178 connected to the brake pedal 122. The cable 176 then passes through the connection 160 and extends to and is connected with the crank 164.

When the operator depresses the brake pedal 122 a portion of the force exerted is transmitted through the cable 174 to positively rotate the crank 164 to apply the brakes. As the cable 176 becomes tightened a force is exerted on the crank 138 which will rotate the crank and actuate the servo mechanism 124 as discussed in connection with the preferred embodiment. A force is then exerted by one of the cables 156 or 158 which will be exerted upon the cable 176 to tighten the cable and rotate the crank 164 to apply the brakes. A part of the force exerted by the servo mechanism 124 will be directed back through the pulley 178 to the brake pedal 122 so that the operator may be apprised of the amount of brake applying force exerted.

As illustrated in Figure 8, the effective lever arm of the connection between the brake pedal 122 and the servo actuated cable 176 may be varied so as to give any desired distribution of forces. This may be accomplished by moving the connection 180 (between the pulley 178 and the brake pedal) to any one of a plurality of holes 182 in the brake pedal 122. For instance one-third of the force applied to the brake pedal 122 by the operator may be effective to positively apply the brakes through the cable 174, and the other two-thirds may be effective on the cable 176. A part of this force will be exerted on the crank 164 and the remainder will be exerted upon the arm 138 to actuate the servo mechanism 124. When the servo commences to operate a part of the force exerted by it will be applied to the crank 164 and the remainder will be exerted back upon the pedal 122 to resist further rotation of the brake actuating pedal 122. It thus appears that in this embodiment of the invention, a novel connection is provided whereby the operator may be apprised of the amount of braking effort applied, by the feel of the pedal. Any desired proportional amount of the force applied may be directed back against the pedal to give a definite reaction on the brake pedal as the servo mechanism becomes effective to further apply the brakes.

If desired the stator disc 128 may be moved out of contact with the rotor disc 126 by means of springs 184 as shown in Figures 7 and 8.

Figure 9:
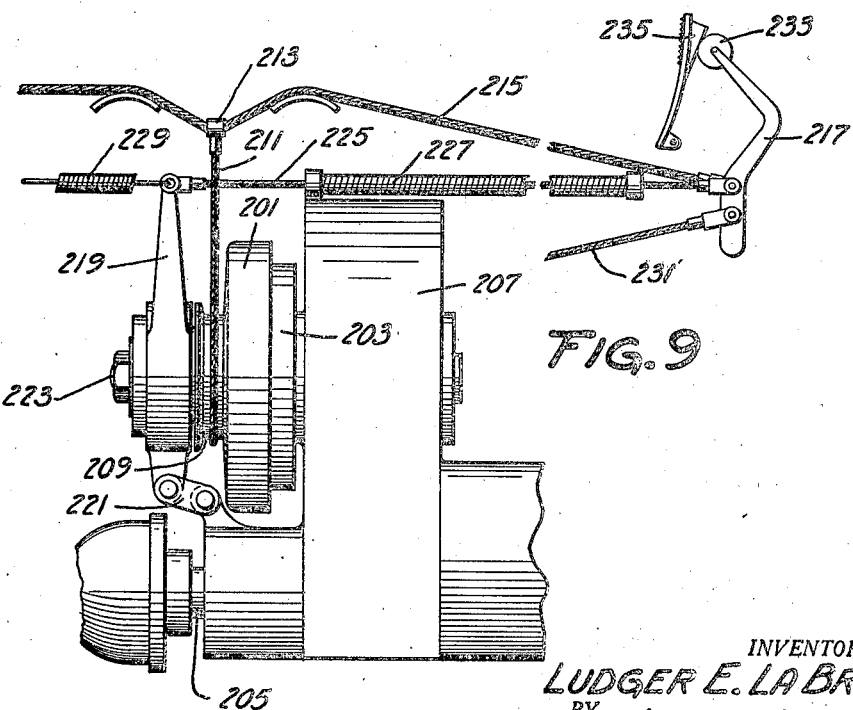
Figure 9 is an elevational view of a modified form of servo mechanism and applying means therefor.

Figure 9 discloses a servo mechanism wherein the rotor disc 203 is operably connected with the drive shaft 205 of the vehicle by means of gears (not shown) in a housing 207. The stator disc 201 is provided with a slot 209 which receives a cable 211 in fixed relation therewith in the same manner as the preferred embodiment described above. The cable 211 is provided with a connection 213 which receives a brake actuating cable 215 connected at one end to a brake actuating member 217, and at the other end to a brake actuator (not shown in this figure).

The stator disc 201 is urged into contact with the rotor disc 203 by a lever clutch mechanism comprising a lever 219 pivoted at one end to a link 221 fixed to the housing 207. The link 219 is apertured to receive a shaft 223 supporting the stator disc 201. The upper end of the lever 219 is fitted with a cable 225 which passes through a conduit 227 and connects with the brake actuating member 217. A return spring 229 operates to move the lever 219 to the left as viewed in Figure 9 to permit the stator member 201 to disengage the rotor member 203 at all times except when the brake actuating member 217 is depressed. A cable 231 serves to positively connect the brake actuating member 217 to the brake actuator (not shown in this figure), so that the brakes may be applied manually should the servo mechanism become inoperative.

The brake actuating member 217 is provided with a roller 233 which engages the flat under surface of a treadle 235 positioned to be actuated by the operator.

The operation of this device is as follows. When the operator wishes to apply the brakes he depresses the treadle 235 which transmits force to the brake actuating member 217 to rotate it in the clockwise direction as viewed in Figure 9. As the member 217 is rotated the cable 231 directly connected to the brake applying mechanism positively applies the brakes. The cable 225 is moved to the right to rotate the lever 219 in the clockwise direction to move the stator disc 201 into contact with the rotor disc 203. The stator disc tends to rotate with the rotor disc and as it rotates, the cable 211 fixed thereto is wrapped upon the disc and exerts a force upon the cable 215. Part of this force is exerted upon the brakes to further apply them and part of it is directed back to the brake applying member 217 to exert a force tending to rotate the member 217 in the counterclockwise direction thereby exerting a reaction back on the treadle 235 so that the operator may be apprised of the amount of braking force applied.

While several embodiments of the invention have been illustrated and described in detail it is not intended to limit the invention to those details, nor otherwise than by the terms of the following claims.

I claim:

1. In a brake system for vehicles having wheels, a set of brakes connected to the wheels, a driving shaft a brake pedal, connecting means between the brake pedal and the brakes, a servo motor comprising a relatively stationary disc and a rotor disc carried by the driving shaft, a connection between the relatively stationary disc and the connecting means whereby rotation of said disc in either direction exerts a force upon said connecting means to further apply the brakes and to resist the movement of the brake pedal, means actuated by the brake pedal to urge the relatively stationary disc into contact with the rotor disc and means directly connecting said brake pedal with the brakes.

2. In a brake system for vehicles, a brake pedal, a cross shaft, means to actuate the brakes upon rotation of the cross shaft, a connection between the brake pedal and the cross shaft, a servo motor comprising a relatively stationary disc and a rotor disc, means actuated by the brake pedal to urge the relatively stationary disc into engagement with the rotor disc, connecting means between the relatively stationary member and said connection whereby a portion of the force exerted by the rotor disc upon the relatively stationary disc is effective to apply the brakes, and the remainder of said force is exerted upon the brake pedal to resist further movement of said pedal and an auxiliary positive connection between the brake pedal and the cross shaft.

3. In a vehicle having an engine and wheels, a drive shaft for transmitting power from the engine to the wheels, brakes connected with the wheels, a brake pedal, a connection between the brake pedal and the brakes, a servo motor comprising a rotor disc fixed to the drive shaft and a disc slidably mounted upon the drive shaft, means to connect the slidably mounted disc to the connection between the brake pedal and the brakes so that rotation of said slidably mounted disc exerts tension on said connection, means including ball members positioned in matching conical indentations actuated by the brake pedal to urge the slidably mounted disc into contact with the rotor disc fixed to the drive shaft to exert tension on the connection between the brake pedal and the brakes to assist the operator in applying the brakes.

4. In a vehicle having an engine and wheels, a drive shaft for transmitting power from the engine to the wheels, brakes connected with the wheels, a brake pedal, a connection between the brake pedal and the brakes, a servo motor comprising a rotor disc fixed to the drive shaft and a disc slidably mounted upon the drive shaft, means to connect the slidably mounted disc to the connection between the brake pedal and the brakes so that rotation of said slidably mounted disc exerts tension on said connection, means including ball members positioned in matching conical indentations actuated by the brake pedal to urge the slidably mounted disc into contact with the rotor disc fixed to the drive shaft to exert tension on the connection between the brake pedal and the brakes to assist the operator in applying the brakes and to react against further application of the brakes and to apprise the operator of the amount of braking effort exerted.

5. A brake actuating mechanism for vehicles having a power shaft and wheel brakes, a pivotally mounted brake pedal, a connection between the brake pedal and the brakes, a servo motor including a frictional element fixed to the power shaft and a frictional element rotatably mounted on the power shaft, means including ball members received in matching conical indentations and a lever for urging the frictional elements into engagement, a pulley fixed to the brake pedal, a guide pulley, a cable fixed to the lever passing over the guide pulley around the pulley fixed to the brake pedal and connecting with the brakes, and connecting means between the rotatably mounted element and said cable.

6. A brake actuating mechanism for vehicles having a power shaft and wheel brakes, a pivotally mounted brake pedal, a cross shaft, a connection between the cross shaft and the brake pedal, connecting means between the cross shaft and brakes, a servo motor including a frictional element fixed to the power shaft and a frictional element rotatably mounted on the power shaft, means including a lever for urging the frictional elements into engagement, a pulley fixed to the brake pedal, a guide pulley, a cable fixed to the lever passing over the guide pulley around the pulley fixed to the brake pedal and connecting with the cross shaft, connecting means between the rotatably mounted element and said cable, and means to adjust the effective lever arm of the pulley fixed to said brake pedal.

7. A brake actuating mechanism for vehicles having a power shaft and wheel brakes, a pivotally mounted brake pedal, a cross shaft, a connection between the cross shaft and the brake pedal, connecting means between the cross shaft and brakes, a servo motor including a frictional element fixed to the power shaft and a frictional element rotatably mounted on the power shaft, means including a lever for urging the frictional elements into engagement, a pulley fixed to the brake pedal, a guide pulley, a cable fixed to the lever passing over the guide pulley around the pulley fixed to the brake pedal and connecting with the cross shaft, connecting means between the rotatably mounted element and said cable, and means to adjust the effective lever arm of the pulley fixed to said brake pedal to vary the reaction exerted back to the brake pedal, the brake applying force exerted by the servo motor and the force exerted to further actuate said servo motor.

8. In a brake system for vehicles having a power shaft and wheel brakes, a brake pedal, a connection between the brake pedal and the brakes, said connection including a servo motor comprising a rotor disc driven by the power shaft and a friction disc associated with the rotor disc and adapted to engage therewith, a cable engaging said connection and fixed to a portion of the friction disc to anchor the friction disc and to exert a force on said connection when the friction disc is rotated to apply the brakes and to exert a portion of the applied force to resist application of the brakes, said connection being adapted to transmit force from said pedal to said brakes independently of said servo motor, actuating means including a pivoted lever to urge the friction disc into contact with the rotor disc, and means including a cable connecting the actuating means to the brake pedal.

9. In a brake system for vehicles having a power shaft and wheel brakes, a brake lever, a connection between the brake lever and the brakes, a servo motor including a rotor disc driven by the power shaft and a friction disc carried by the power shaft and associated with the rotor disc and adapted to engage therewith, a cable engaging said connection and fixed to a portion of the friction disc to anchor the friction disc and to exert a force on said connection when the friction disc is rotated said connection being adapted to transmit force from said lever to said brakes independently of said servo motor, actuating means including a pivoted lever to urge the friction disc into contact with the rotor disc to apply the brakes and to exert a portion of the applied force to resist further application of the brakes, means including a cable connecting the actuating means to the brake lever and a pivotally mounted treadle to actuate said brake lever.

10. In a brake system for a vehicle having a power shaft and wheel brakes, a servo motor having a rotor disc fixed to the power shaft and a relatively stationary disc operably connected to the brakes, means including ball members partly received in cooperating conical indentations to urge the relatively stationary disc into engagement with the rotor disc, and a brake pedal to actuate the servo motor to apply the brakes, and a connection between the brake pedal and the servo motor to exert a force opposing further movement of the brake pedal.

11. In a brake system for vehicles having a power shaft and wheel brakes, a brake pedal, a servo motor having a rotor disc fixed to the power shaft, and a relatively stationary disc, means including a lever to urge the relatively stationary disc into contact with the rotor disc, a cable connecting the brake pedal to the brakes, means connecting the relatively stationary disc to the cable whereby the cable is subjected to a force to apply the brakes and to react against the brake pedal when said relatively stationary disc is urged into contact with the rotor disc.

12. In a brake system for vehicles having a power shaft and wheel brakes, a brake pedal, a servo motor having a rotor disc fixed to the power shaft, and another disc slidably mounted on the power shaft, means including a lever to urge the slidably mounted disc into contact with the rotor disc, a cable connecting the brake pedal to the brakes, means connecting the slidably mounted disc to the cable whereby the slidably mounted disc is restrained from rotation by the cable and the cable is subjected to a force to apply the brakes and to react against the brake pedal when said slidably mounted disc is urged into contact with the rotor disc by the actuation of the brake pedal.

13. In a brake system for vehicles having a power shaft and wheel brakes, a brake pedal, a servo motor operably connected with the power shaft, means including a lever to actuate the servo motor, a pulley fixed to the brake pedal, a cable connected to said lever and passing around said pulley and connecting with the brakes, and connecting means between the servo motor and the cable whereby upon actuation of the brake pedal the servo motor is actuated to assist the operator in applying the brakes and to exert a reaction back against the pulley to resist further actuation of the brake pedal.

14. In a brake system for a vehicle having a drive shaft, a brake pedal, a servo motor comprising a rotor disc driven by the drive shaft and a disc associated with the rotor disc and adapted to be urged into engagement therewith, connecting means between the brake pedal and the brakes, means anchoring the last named disc to the connecting means, and means separate from said connecting means and actuated by the brake pedal to urge the last named disc into engagement with the rotor disc.

LUDGER E. LA BRIE.